United States Patent [19]

Hobbs

[11] Patent Number: 5,691,016
[45] Date of Patent: Nov. 25, 1997

[54] PERMEATION RESISTANT CONTAINERS

[75] Inventor: John Peter Hobbs, Lansdale, Pa.

[73] Assignee: Air Products and Chemicals, Inc., Allentown, Pa.

[21] Appl. No.: 590,020

[22] Filed: Jan. 25, 1996

Related U.S. Application Data

[60] Continuation of Ser. No. 337,355, Nov. 10, 1994, abandoned, which is a division of Ser. No. 91,485, Jul. 13, 1993, Pat. No. 5,401,451.

[51] Int. Cl.$^6$ ............ B23D 23/00; B32B 1/08; B32B 27/32
[52] U.S. Cl. ............ 428/35.7; 428/36.6; 428/36.9; 428/36.92; 428/421
[58] Field of Search ............ 428/35.7, 36.6, 428/36.9, 36.92, 421

[56] References Cited

U.S. PATENT DOCUMENTS

| | | | |
|---|---|---|---|
| 4,142,032 | 2/1979 | D'Angelo | 526/43 |
| 4,264,750 | 4/1981 | Anand et al. | 525/356 |
| 4,404,256 | 9/1983 | Anand et al. | 428/409 |
| 4,593,050 | 6/1986 | Cohen et al. | 522/2 |
| 4,617,077 | 10/1986 | Giese et al. | 156/245 |
| 4,701,290 | 10/1987 | Eschwey et al. | 264/40.1 |
| 4,830,810 | 5/1989 | Ufer et al. | 264/40.1 |
| 4,869,859 | 9/1989 | Eschwey et al. | 264/83 |
| 5,073,231 | 12/1991 | Eschwey et al. | 156/646 |
| 5,213,734 | 5/1993 | Masson et al. | 264/83 |
| 5,244,615 | 9/1993 | Hobbs | 264/83 |

*Primary Examiner*—D. S. Nakarani
*Attorney, Agent, or Firm*—Mary E. Bongiorno; Russell L. Brewer

[57] ABSTRACT

The present invention discloses an improved process for producing plastic containers with excellent resistance to permeation by solvents such as hydrocarbons, hydrocarbon fuels, and hydrocarbon fuels with organic additives including lower alkanols and ethers consistently and reliably. The process is related to a multi-step treatment of plastic containers in a controlled manner with fluorine containing gases while blow molding them. In the process of the present invention, a parison is formed from a pre-heated thermoplastic material, expanded within a closed mold by means of an inflating gas for conforming the parison to the shape of the mold, and subjected to multiple fluorination treatment steps to effect fluorination of the interior surface of the parison. In the first step of the multi-step fluorination treatment the parison is pressurized with a reactive gas containing from about 0.05 to about 0.5% fluorine by volume while the parison is at a temperature above its self supporting temperature and for a time sufficient to effect fluorination of the interior surface of the parison. Subsequently, the interior surface of the pre-fluorinated parison is pressurized with a reactive gas containing fluorine in a concentration that is greater than that used in the initial fluorination step for a time sufficient to form said fluorinated parison with excellent resistance to solvent permeation. The parison is purged with an inert gas, vented and the container recovered. The key requirements for producing containers with excellent resistance to solvent permeation consistently and reliably include (1) minimizing and/or eliminating the molecular oxygen contaminant in the parison while treating it with fluorine containing reactive gas and (2) selecting the concentration of fluorine in the reactive gas for the first and subsequent fluorination treatment steps in such a way that it eliminates both under and over fluorination of the inside surface of the parison.

3 Claims, 3 Drawing Sheets

PERMEATION RESISTANT CONTAINERS

This is a continuation of application Ser. No. 08/337,355 filed Nov. 10, 1994, now abandoned, which is a divisional of application Ser. No. 08/091,485 filed Jul. 13, 1993, U.S. Pat. No. 5,401,451.

FIELD OF THE INVENTION

This invention relates to a process for producing permeation resistant containers.

BACKGROUND OF THE INVENTION

Fluorination of polyethylene and other polymeric materials to improve their resistance to solvents and to vapor permeation has long been practiced. Early work was reported by Joffre in U.S. Pat. No. 2,811,468 and Dixon et al. in U.S. Pat. No. 3,862,284. The '468 patent discloses a process of fluorinating polyethylene material in a chamber to improve barrier properties thus enhancing the material as a wrapping material for foodstuffs and perishable materials. More specifically, it discloses a fluorination process carried out at room temperature or at a temperature below about 50° C. with 100% fluorine or an inert gas containing 10% fluorine for a period of about 20 to 150 minutes to achieve surface fluorine concentrations of 0.03 to 3.5 percent by weight of fluorine based on the weight of the polyethylene. Dixon et al., in '284 discloses fluorination of a variety of polymeric materials in blow molding operations to enhance their barrier properties. A treatment gas containing from about 0.1 to 10% by volume of fluorine in an inert gas was injected into the parison to inflate or expand it into shape. Due to the higher temperature, a combined blowing and reaction time of approximately 5 seconds was utilized at which time the parison was cooled and the reactive gas and container recovered.

Commercially fuel tanks having enhanced resistance to hydrocarbon permeation have been marketed under the Airopak trademark wherein the fuel tanks are produced by utilizing blow molding techniques. In these processes the parison is initially conformed to the desired shape by inflating or expanding with an inert gas, followed by purging of the parison and subsequent injection of the parison with a reactive gas containing from 0.1 to 10% fluorine. The reactive gas is removed from the parison, recovered and the container ejected from the mold.

There have been substantial modifications to the early processes for the production of containers having enhanced barrier properties via blow molding. Some of the processes are described in the following patents:

U.S. Pat. No. 4,142,032 discloses an apparent improvement in the Dixon et al., process utilizing a reactive gas containing both fluorine and bromine at temperatures below the softening point of the polymer and pressures one atmosphere or less. Basically, then, the '032 process is similar to that of Joffre '468 in that the fluorination/bromination is effected at low temperature, thus requiring long reaction times.

U.S. Pat. Nos. 4,404,256; 4,264,750; and 4,593,050 disclose a low temperature fluorination of polyolefins, e.g., polyethylene and polypropylene, to form low energy surfaces utilizing wave energy in association with the fluorination process. The '256 and '750 patents disclose contacting the polymer surface with ions or radicals comprising fluorine or fluorinated carbon in a cold plasma. The '050 discloses fluorination of polymer surfaces utilizing a fluorinating gas and enhancing the fluorination by exposing the surface to ultraviolet radiation to assist in the fluorination process.

U.S. Pat. No. 4,701,290 discloses the production of high density polyethylene fuel tanks having increased barrier resistance to hydrocarbon solvent and vapor permeation via off-line fluorination. The key to enhancing barrier permeation resistance lies in the precise control of fluorination of the polyethylene fuel tank and this is achieved by passing the treatment gas through a container filled with aluminum oxide. By measuring the quantity of oxygen generated from the $Al_2O_3$, one controls the concentration of fluorine contained in the treatment gas and thereby controls the level of fluorine acting upon the surface of the container within a predefined reaction time.

U.S. Pat. No. 5,073,231 discloses an off-line fluorination process for producing plastic objects with a smooth surface finish. According to this patent, smooth surfaces are produced by treating plastic objects at elevated temperatures with a mixture of fluorine and an oxidizing agent. Fluorinated surfaces thus produced are claimed to (1) incorporate very low fluorine in the plastic (less than 6 $\mu g/cm^2$) and (2) provide good barrier action against non-polar solvents.

Improvements in blow molding processes have also been made since the discovery of the Dixon, et al. higher temperature blow molding process and these are reported in U.S. Pat. Nos. 4,830,810; 4,617,077; and 4,869,859. The '810 patent discloses a blow molding process for producing containers comprising inserting the preform or parison into the mold, injecting inert gas into the parison at a first level of pressure to expand and conform it to the shape of the mold, raising the pressure to a level above the first level by injecting a fluorine containing reactant gas into the parison after pressure tightness has been determined. The reactant gas typically comprises a mixture of fluorine and nitrogen with the fluorine concentration being about 1% by volume; the injection pressures are from 4 to about 10 bar and reaction times of about 30 seconds. The process eliminates some of the hazards associated with blow molding using a reactive gas to conform the parison to the mold since pressure tightness at the time of injection of the reaction gas may not have been established. The '077 patent modifies the '810 process in that inflation of the parison in the mold with an inert gas is conducted at high pressure followed by treatment of the interior of the parison with a fluorine containing gas at substantially lower pressure than that used for initially expanding the parison or preform. After reaction, the reaction gas is replaced with a flushing and cooling gas at a pressure substantially higher than the pressure of the reaction gas and even higher than the initial injection gas used to preform the parison.

U.S. Pat. No. 4,869,859 discloses a blow molding process for the preparation of high density polyolefin fuel tanks. The patentees indicate that severe wrinkling of the thermoplastic occurs at temperatures close to or above the melting point, causing an increase in the permeation rate of the solvent. According to this patent, fluorination is carried out at temperatures from 50° to 130° C., preferably 80° to 120° C., and below the melting temperature of the polymer, in an effort to achieve uniform temperature distribution and fluorination of the interior surface of the material.

U.S. patent application having Ser. No. 07/985,665 filed Dec. 3, 1992 discloses a multi-step blow molding process for producing permeation resistant thermoplastic containers. A thermoplastic parison is expanded within a closed mold by means of an inert gas, the parison vented and then treated with a reactive gas containing 0.1 to 1% fluorine by volume while the parison is at a temperature above its self supporting temperature for a time sufficient to effect fluorination of the interior surface of the parison. Subsequently, the interior surface of the pre-fluorinated parison is treated with a reactive gas containing at least twice the initial concentration but not less than about 1% fluorine by volume for a specified time to form the fluorinated parison with increased permeation resistance.

SUMMARY OF THE INVENTION

This invention relates to an improvement in an in-line, multi-step fluorination process for the blow molding of thermoplastic containers such as fuel containers and bottles which have excellent solvent barrier properties. The containers have excellent barrier properties with respect to liquid and vapor permeation by hydrocarbons, polar liquids, hydrocarbon fuels, and hydrocarbon fuels containing polar liquids such as alcohols, ethers, amines, carboxylic acids, ketones, etc. The improvement in the in-line, multi-step fluorination process for consistently and reliably producing blow molded thermoplastic articles having excellent solvent barrier properties resides in (1) forming a parison of thermoplastic material and expanding it within a closed mold by means of an inert gas for conforming the parison to the shape of the mold; (2) establishing and maintaining an oxygen contaminant level generally below about 50 ppm in the case of polyethylene and polypropylene, i.e., non-oxygen containing polymers, the oxygen-to-carbon ratio (O/C) in the fluorinated layer of the polymer is maintained at less than about 0.08; (3) fluorinating the parison initially with a reactive gas containing from about 0.05 to 0.5% fluorine by volume while the thermoplastic is at a temperature above its self-supporting temperature for a time sufficient to effect fluorination of the surface of the parison; (4) further fluorinating the pre-fluorinated parison while at an elevated temperature with a reactive gas containing fluorine in a concentration greater than that used in the initial fluorination but less than about 2.0%, and (5) evacuating the parison, and purging and recovering it from the mold.

The key to the improvement in the process is the combination of multi-step fluorination and the establishment and maintenance of an essentially oxygen free environment during the fluorination steps. Because of the low oxygen concentration, the concentration of fluorine in the reactive gas for the first and subsequent fluorination treatment steps is controlled in such a way that it eliminates both under and over fluorination of the inside surface of the parison and provides uniform fluorination of the inside surface of the container.

There are several advantages associated with the in-line multi-step fluorination process to produce containers having improved barrier properties, and these include:

the ability to form permeation resistant containers having enhanced barrier properties, particularly with respect to hydrocarbons, polar liquids and hydrocarbons containing polar liquids such as alcohols, ethers, amines, carboxylic acids, ketones, etc.;

the ability to produce permeation resistant containers via an in-line blow molding process while achieving fluorination at commercial production rates;

the ability to consistently and reliably produce high density polyethylene fuel containers particularly suited for the automotive industry, such containers having reduced permeation associated with hydrocarbon fuels blended with lower alcohols such as methanol, ethanol, ethers such as methyl tertiary butyl ether, ketones, etc.; and, the ability to produce thin-walled containers utilizing reduced levels of fluorine in the treatment of reactive gas, thereby reducing the total cost of fluorinating containers.

DRAWINGS

DETAILED DESCRIPTION OF THE INVENTION

Figure 1:
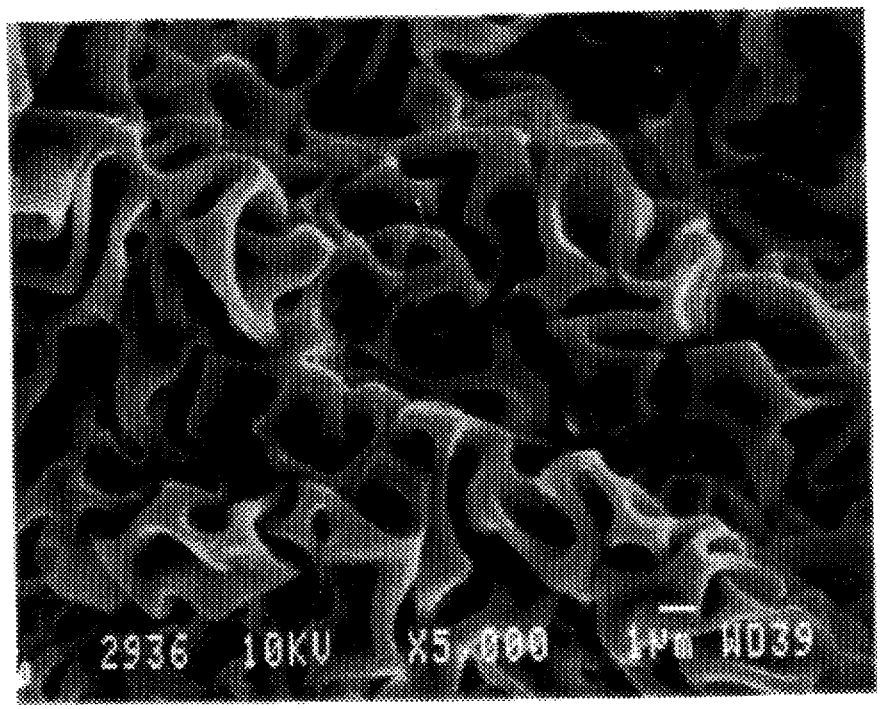
FIG. 1 is a Scanning Electron Micrograph of a fluorinated fuel tank surface at 5,000× magnification showing the appearance of an over fluorinated surface of the fuel tank.

Automotive standards regarding solvent and vapor permeation rates associated with hydrocarbon fuels and particularly hydrocarbon fuels containing minor portions of lower alkanols have been established for some time. Fuel tanks constructed of fluorinated high density polyethylene and produced via in-line fluorination processes meet current environmental emission requirements from the automobile manufacturers. However, such fuel containers do not meet the proposed environmental emission requirements, particularly when those hydrocarbon fuels are blended with polar liquids such as lower alkanols, e.g., methanol, ethanol, ethers such as methyl tertiary butyl ether, ketones, amines and other fuel additives. The California Air Resources Board (CARB) has proposed regulations suggesting that a final permeation rate of less than 0.2 grams per day would be desirable for future fuel tanks.

Blow molding of thermoplastic materials to produce containers of various sizes, wall thicknesses and shapes is well known. Thermoplastic material such as polymers and copolymers of polystyrene, polyacrylonitrile, polyvinyl chloride and particularly polyolefins such as low density and high density polyethylene and polypropylene often are used in producing containers and they can be treated via in-line fluorination to enhance their solvent barrier properties in accordance with this process. The process is particularly adapted for the fluorination of thick-walled containers, e.g., 4 millimeters (mm) and greater, typically 4 to about 6 mm high density polyethylene for the fabrication of fuel tanks for the automotive industry and thin-walled, e.g., 3 mm and less wall thickness, bottle-type containers.

In a typical blow molding process for producing hollow articles or containers, a thermoplastic material is heated to a temperature above its softening point, formed into a parison and injected into a mold. The parison is inflated or expanded in its softened or molten state via sufficient pressurization with a gas to conform the parison to the contour of the mold. In many processes, fluorine-containing gases initially are used to inflate and conform the parison to the contour of the mold. In recent years, the parison initially has been conformed to the mold via pressurization with a substantially inert gas, e.g., nitrogen, helium, or argon, to ensure that a seal is formed, then fluorinated in an effort to reduce environmental contamination and occupational hazards.

The in-line, multi-step process for fluorinating fuel tanks and thin-walled bottle type polymer containers for producing containers having an excellent barrier to hydrocarbon solvents containing polar liquids involves carefully controlling the polymer temperature, concentration of fluorine and oxygen in the reactive gas used during fluorination of the parison and the contact time of fluorination. In this process, the parison is evacuated or purged, inflated and initially contacted with a reactive gas containing a low concentration of fluorine (0.05 to 0.5% by volume, and preferably 0.2 to 0.4%), the balance thereof being inert under the reaction conditions, at a temperature above the self-supporting temperature of the thermoplastic and for a time sufficient to effect surface fluorination. This usually requires from about 2 to 60 seconds, preferably 5 to 45 seconds. The self-supporting temperature is defined as the temperature above which the parison or container will collapse if removed from the mold. A low concentration of fluorine is selected for the initial step because the use of a high concentration of fluorine while the polymer is at a temperature above the self-supporting temperature is believed to damage the polymer surface, thereby reducing its barrier properties. The pre-fluorinated parison is then contacted with a reactive gas containing a relatively high concentration of fluorine (greater than 0.3, preferably greater than 0.7 and up to about 2% by volume) in subsequent steps to further fluorinate the polymer without causing damage to the polymer surface. Typically, the fluorine concentration will range from 0.7 to 1.6%. Excessive localized heating is believed to be reduced since many of the available reactive sites are reacted with fluorine in the initial treatment and because the surface temperature of the pre-fluorinated parison is reduced on contact with the ambient temperature gas.

The consistency and reliability of the containers as to barrier resistance are controlled by monitoring and controlling the amount of oxygen contaminant in the parison during the fluorination process. The oxygen contaminant has been found to compete with fluorine during the fluorination process carried out at an elevated temperature. It is believed the oxygen contaminant changes the effective rate of reaction of fluorine with the polymer material and results in the incorporation of oxygen functionalities in the fluorinated polymer layer. The presence of oxygen contaminant in the parison results in erratic and inconsistent fluorination of the polymer. For example, low, uncontrolled levels of oxygen with high fluorine concentrations may result in over fluorination while high oxygen levels with low fluorine concentrations may lead to under fluorination; the parison can either be over fluorinated or under fluorinated depending on the amount Of oxygen contaminant in the parison and the concentration of fluorine used during fluorination. The under or over fluorination of the parison as well as the incorporation of oxygen functionalities in the fluorinated layer decreases the solvent permeation resistance of the containers.

A key feature of the process involves carefully purging the parison and inert gas and reactive gas feed lines to reduce the oxygen contaminant level below about 50 ppm in the parison prior to fluorination. By keeping the oxygen concentration low, the desired O/C ratio in the fluorinated layer is maintained. However, because of the difficulty in analyzing oxygen levels during the fluorination process steps, it is easier to verify the effectiveness of the purging process for the removal of oxygen at each gas feed and exhaust line to the polymer container by analyzing the exhaust gas from a purged nonfluorinated parison or by analyzing the fluorinated surface of containers with respect to the oxygen/carbon ratio. If the ratio of oxygen to carbon in the fluorinated layer is 0.08 or above, then the process may require additional purging of the gas feed lines. (Monitoring of oxygen is done in the absence of fluorine because of the corrosivity of the fluorine to analytical equipment. It is the effectiveness of the purge with inert gas that is controlling and its effectiveness can be measured in the absence of fluorine.) With a reduction in oxygen contamination, the concentration of fluorine in the reactive gas for the first and subsequent fluorination treatment steps can be reduced vis-a-vis fluorination in an oxygen contaminated atmosphere. It can be controlled in such a way that it eliminates both under and over fluorination of the inside surface of the treated parison.

The in-line, multi-step fluorination process utilizes an extremely dilute fluorine containing gas, e.g., greater than 0.05%, but generally not greater than about 0.5%, and preferably between 0.2 and 0.4% by volume as the fluorinating agent in the initial fluorination of thermoplastic containers while carefully minimizing and/or eliminating the oxygen contaminant in the container and while the thermoplastic is at a temperature above the self-supporting temperature of the polymer. For example, a temperature generally varying from about and above 105° C. to 130° C. would be required for high density polyethylene (HDPE). If higher concentrations of fluorine in the reactant gas, e.g., greater than 0.5%, are injected into the parison while carefully minimizing and/or eliminating the oxygen contaminant in the parison and while the polymer is above the self-supporting temperature, the fluorine will react aggressively with the polymer and will cause over fluorination resulting in increased solvent permeation. The contact or reaction time for the initial fluorination step may range from about 2 to 60 seconds, preferably from about 5 to 45 seconds. Although contact times can extend for very dilute reactive gas streams beyond 60 seconds, no significant advantages are expected to be achieved. However, if a reaction time of less than 2 seconds is employed for the initial fluorination, the fluorine will not have enough time to react with the polymer and the polymer will be under fluorinated. Reaction or contact pressures for the initial fluorination step are conventional and range from 2 to 50 bar.

Since the initial fluorine treatment is carried out above the self-supporting temperature of the polymer, it is very important to carefully control the time involved in expanding and conforming the parison to the mold with an inert gas, if such initial step is used. The temperature of the polymer surface is largely dependent on the thickness of the wall, the temperature of the inflating gas, and the contact time necessary for expanding and conforming the parison to the mold. For example, thin-walled containers cool rapidly on contact with room temperature inflation gas, thereby permitting the use of relatively higher fluorine concentrations in the reactive gas. Thick-walled containers maintain elevated temperature for a longer period of time and relatively lower fluorine concentrations in the reactive gases are often required because of excessive surface temperatures. In any case, it is important to carefully control the expanding and conforming time in such a way that the initial fluorine treatment with a reactive gas containing an extremely low concentration of fluorine is carried out at a temperature above the self-supporting temperature of the polymer.

Once the surface of the polymer has been fluorinated with a low concentration of fluorine in the initial step at a temperature above the self-supporting temperature of the polymer, further fluorination of the surface to achieve the final reduction in permeability and enhanced physical properties is effected. Secondary fluorination of the prefluorinated parison is carried out by contacting the surface with a fluorine-containing gas with the fluorine concentration ranging from about 0.3 to about 2%, preferably from about 0.7 to about 1.6% by volume but the concentration of fluorine typically is from about 1½ to 4 times that used in the initial fluorination step. It is, once again, important to carefully minimize and/or eliminate the oxygen contaminant in the parison during fluorination to obtain fuel tanks with consistent and reliable solvent permeation resistance. If the secondary fluorination is carried out with higher than 2% fluorine in the reactive gas with low levels of oxygen contaminant in the parison while the polymer is at elevated temperatures, the fluorine can react aggressively with the polymer and cause over fluorination. The secondary fluorination of the prefluorinated parison is carried out for a period of 2 to 60 seconds, preferably a period of 5 to 45 seconds when the container wall temperature is at an elevated temperature but below the self-supporting temperature. Once again, if a reaction time of less than 2 seconds is employed for the secondary fluorination, the fluorine may not have enough time to react with the polymer and the polymer will be under fluorinated. It is treatment of the pre-fluorinated parison with a higher concentration of fluorine in the subsequent reactive gas in the presence of the minimum amount of oxygen contaminant that causes a second fluorination of the parison to occur, thereby creating a second fluorine-polymer gradient. With each secondary fluorine treatment step, enhanced fluorination is achieved and essentially no over fluorination is observed by the reaction of reactive gas having a slightly higher concentration of fluorine gas with the thermoplastic polymer.

In a preferred embodiment, containers with excellent solvent permeation resistance are made consistently and reliably from polyethylene. Initial fluorination of the parison, and preferably at least the first treatment associated with the secondary fluorination, is to be conducted at above the self-supporting temperature of polyethylene while carefully minimizing and/or eliminating the oxygen contaminant in the parison. For polyethylene, the self-supporting temperature will vary from 105° C. to 130° C. and with final temperatures reaching below about 100° C. prior to ejection of the parison from the mold. If more than two fluorination steps are used in the multi-step process, subsequent steps may be carried out at temperatures below the self-supporting temperature of polyethylene.

The concentration of fluorine in the reactive gas for the fluorination steps is selected in such a way that it eliminates both under and over fluorination of the polymer. The polymer is considered to be under fluorinated if the fluorinated layer contains a fluorine concentration of less than about 10 $\mu g/cm^2$, preferably less than about 15 $\mu g/cm^2$, as determined by a combination of x-ray fluorescence (XRF) and Rutherford back scattering (RBS) techniques. A lower concentration of fluorine in the barrier layer would result in poor solvent permeation resistance.

Although an effective fluorination treatment results in some "rumpling" of the polymer surface, an over fluorinated surface displays a more pronounced rumpling, the magnitude of which can be quantified by the increase in the surface area. It is believed that the higher solvent permeation rate observed is due to an increase in surface area available for transport, as well as possible surface stresses induced by the rumpling. The polymer is considered to be over fluorinated if the fluorinated layer has a ratio of actual surface area to geometric surface area greater than about 2, preferably greater than about 1.8. The actual and geometric surface areas are determined by using scanning tunneling microscopy (STM). The geometric surface area corresponds to the surface area of a perfectly flat surface.

To summarize, in the improved in-line, multi-stage process, initial contact of the parison is made with a very dilute fluorine containing reactive gas for fluorinating the surface of the parison while the thermoplastic is in its softened state and at a temperature above the self-supporting temperature for limited times. Oxygen contaminant levels are maintained at low levels, e.g., below 50 ppm or such that an oxygen-to-carbon ratio in the fluorinated polymer layer is below 0.08. The very dilute fluorine-containing reactive gas will have a fluorine concentration not greater than about 0.5% and preferably between 0.2 and 0.4% by volume. Reaction periods of about 2 to 60 seconds, preferably from about 5 to 45 seconds, are employed. Initial surface fluorination at these concentrations effects an initial fluorinated polymer gradient. Secondary fluorination requires a reactant gas having a slightly higher fluorine concentration, typically from about 0.3 to about 2% and preferably from about 0.7 to 1.6% while carefully minimizing and/or eliminating the oxygen contaminant in the parison. Contact times, once again, range from 2 to 60 seconds, preferably from 5 to 45 seconds for secondary treatment steps. If the duration of the fluorination step is too short or the oxygen contaminant present in the parison is too high, the polymer will be under fluorinated and will have a surface fluorine concentration of less than about 10 $\mu g/cm^2$, preferably less than about 15 $\mu g/cm^2$. Likewise, if the concentration of fluorine present during fluorination in the absence of the oxygen contaminant is too high, the polymer surface will be over fluorinated and will have a ratio of actual surface area to geometric surface area greater than about 2, preferably greater than about 1.8. In either case the fluorinated container will display poor solvent permeation resistance.

The following examples are provided to illustrate various embodiments of the invention and are not intended to restrict the scope thereof.

CONTROL EXAMPLE 1

Automobile fuel tanks with a nominal wall thickness of 4.0 mm were prepared from a high density polyethylene (HDPE) by the extrusion blow molding process. During the inflation process the fuel tanks were pressurized to approximately 100 psig with an inert nitrogen gas for a period of 9 seconds (Step 1 or Gas 1), after which the pressure was released from the fuel tanks to allow the nitrogen gas to escape. Because of relatively thick walls of the fuel tanks, the temperature of the polymer remained above the self-supporting temperature of HDPE. The fuel tanks then were repressurized a second time to approximately 100 psig with a reactive treatment gas containing 0.5% fluorine in inert nitrogen for a period of 9 seconds (Step 2 or Gas 2). After this the pressure was released from the fuel tanks to allow reactive gas to escape. The fuel tanks were pressurized a third time to approximately 100 psig with a reactive treatment gas containing 2.5% fluorine in inert nitrogen for a period of 9 seconds. Finally, the fuel tanks were vented to atmospheric pressure, purged with an ambient pressure air stream or an inert gas to remove any traces of reactive treatment gas and removed from the mold. The tanks were, therefore, treated first with a fluorine containing gas at above the self-supporting temperature of HDPE. They were treated further with a fluorine containing gas at a temperature above or below the self-supporting temperature of HDPE or both above and below.

A fuel tank prepared in the above manner was filled with a hydrocarbon solvent mixture consisting of 92.5% indolene (a mixture of hydrocarbons which simulates an unleaded automotive fuel), 5.0% methanol, and 2.5% ethanol by volume to determine hydrocarbon solvent permeability. The mouth of the filled fuel tank was then heat sealed with foil-backed low density polyethylene film and capped. The sealed fuel tank was stored in an ambient pressure air circulating oven at 40° C. for 6 weeks, and its hydrocarbon permeation (weight loss) was monitored periodically. This fuel tank showed a hydrocarbon solvent permeability value of about 0.08 grams per day which was well below the value proposed by CARB. Although the values obtained are good, the results obtained were perhaps fortuitous as Examples 2 and 3 show. Better and more consistent results can be obtained with better oxygen control through monitoring and purging of the lines and parison as is set forth in later examples.

CONTROL EXAMPLE 2

The procedure for fluorinating high density polyethylene (HDPE) fuel tanks described in Control Example 1 was repeated using the identical conditions. The hydrocarbon solvent permeability one of these fuel tanks was determined following the same procedure as described in Control Example 1. This tank showed a hydrocarbon solvent permeability value close to 0.43 grams per day which was considerably higher than noted in Control Example 1 and specified by CARB.

CONTROL EXAMPLE 3

The procedure for fluorinating high density polyethylene (HDPE) fuel tanks described in Control Example 1 was repeated again using the identical conditions. The hydrocarbon solvent permeability of one of these fuel tanks was determined following the same procedure as described in Control Example 1. This tank showed a hydrocarbon solvent permeability value close to 0.47 grams per day which was considerably higher than noted in Control Example 1 and specified by CARB.

One of the fluorinated fuel tanks was analyzed to determine the thickness and composition of the fluorinated layer. The cross-sectional analysis using scanning electron microscopy (SEM) revealed a barrier thickness of ~0.2 µm. The surface composition determined by electron spectroscopy for chemical analysis (ESCA) revealed an O/C ratio of ~0.08 in the top ~100 Å of the barrier layer, indicating a significant incorporation of oxygen in the barrier layer.

CONTROL EXAMPLE 4

High Fluorine Levels

The two step fluorination process described in Control Example 1 was repeated using a similar procedure with the exception of employing 0.8% and 5.0% fluorine in the first and second fluorination steps, respectively. However, precautions were taken including purging the parison and gas feed lines with inert nitrogen gas to minimize and/or eliminate oxygen contaminant prior to and during fluorination of fuel tanks. The level of oxygen contaminant in feed and exhaust lines to the polymer container was measured to be below 50 ppm. The fluorinated barrier thickness determined by analyzing one of the tanks was ~0.3 µm. The O/C ratio in the barrier layer was ~0.01, indicating considerable reduction in the incorporation of oxygen in the barrier later by controlling the level of oxygen contaminant in the feed and exhaust lines to the polymer container.

The hydrocarbon solvent permeability of two of these fuel tanks was determined following a procedure similar to the one described in Control Example 1. These tanks showed a hydrocarbon solvent permeability value above 0.5 grams per day which was higher than noted in Control Examples 1 to 3 and specified by CARB.

The poor solvent permeation resistance value was believed to be related to over fluorination of the fuel tanks which was caused by the use of high concentration of fluorine during the first and second steps in the absence of significant oxygen contamination. Over fluorination of the fuel tanks produced an extremely rough fluorinated surface layer, as shown by a scanning electron micrograph (SEM) in FIG. 1. Furthermore, the over fluorination of the fuel tanks was evidenced by the high ratio of the actual surface area of the fluorinated layer to the geometric surface area—it was greater than about 2.0.

CONTROL EXAMPLE 5

Low and High Fluorine Levels

The two step fluorination process described in Control Example 1 was repeated using a similar procedure with the exception of employing 0.25% and 2.5% fluorine in the first and second fluorination steps, respectively. Further precautions were taken vis-a-vis Control Example 4 including purging the parison and gas feed lines with inert nitrogen gas to minimize and/or eliminate oxygen contaminant prior to and during fluorination of fuel tanks. The concentration of fluorine used in the first and second steps of this example was considerably lower than used in Control Example 4. The level of oxygen contaminant in the feed and exhaust lines to the polymer container was measured to be below 50 ppm. The thickness of the fluorinated barrier layer was ~0.3 µm. The O/C ratio in the barrier layer was ~0.01.

The hydrocarbon solvent permeability of six of these fuel tanks was determined following the procedure similar to the one described in Control Example 1. These tanks also showed a hydrocarbon solvent permeability value above 0.5 grams per day which was higher than noted in Control Examples 1 to 4 and specified by CARB.

Figure 2:
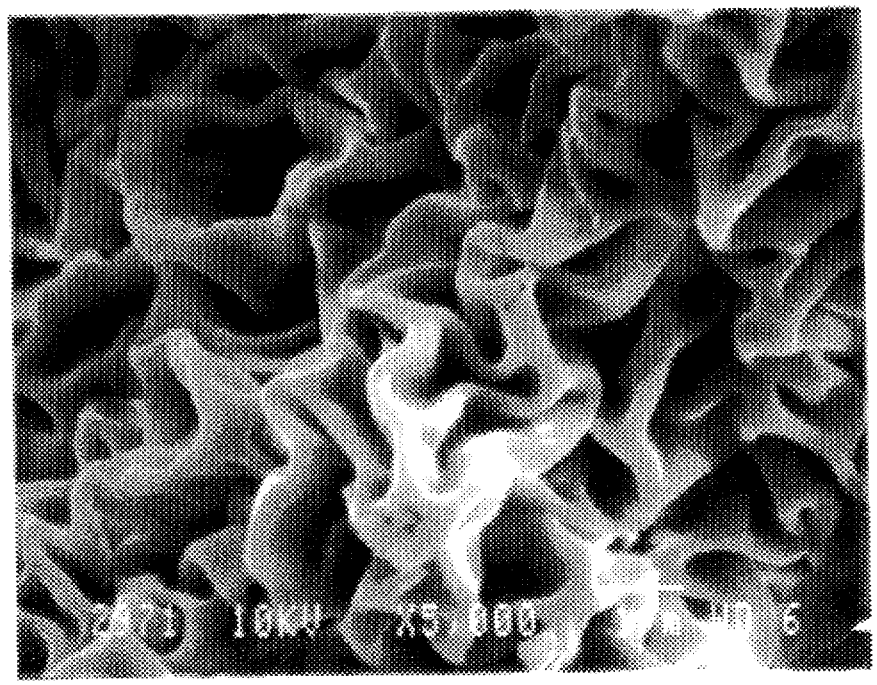
FIG. 2 is a Scanning Electron Micrograph of a fluorinated fuel tank surface at 5,000× magnification showing the appearance of an over fluorinated surface of the fuel tank.

It is believed the poor solvent permeation resistance value was once again related to over fluorination of the fuel tanks caused by the use of high concentration of fluorine during the second step in the absence of significant oxygen contamination. Over fluorination of the fuel tanks produced an extremely rough fluorinated surface layer, as shown by a scanning electron micrograph in FIG. 2. Furthermore, the over fluorination of the fuel tanks was evidenced by the high ratio of the actual surface area of the fluorinated layer to the geometric surface area; it was greater than about 2.0.

CONTROL EXAMPLE 6

Low Fluorine Level, Single-Step Process

Automobile fuel tanks with a nominal wall thickness of 4.0 mm were prepared from a high density polyethylene (HDPE) by the extrusion blow molding process. During the inflation process the fuel tanks were pressurized to approximately 100 psig with an inert nitrogen gas for approximately 5 seconds, after which the pressure was released from the fuel tanks to allow the nitrogen to escape. Because of the relatively thick walls of the fuel tanks, the temperature of the polymer remained above the self-supporting temperature of HDPE. The fuel tanks then were repressurized a second time to approximately 100 psig with a reactive treatment gas containing 0.25% fluorine in inert nitrogen for a period of 16 seconds. After this the pressure was released from the fuel tanks to allow the reactive gas to escape. Finally, the fuel tanks were vented to atmospheric pressure, purged with an ambient pressure air stream or an inert gas to remove any traces of reactive treatment gas and removed from the mold. Proper precautions were taken including purging the parison and gas feed lines with inert nitrogen gas to minimize and/or eliminate oxygen contaminant prior to and during fluorination of the fuel tanks. The fluorination of these tanks was initiated at above the self-supporting temperature of HDPE. In summary, these tanks were prepared using a single step treatment with low concentration fluorine gas. The thickness of the barrier layer was less than about 0.1 μm. The O/C ratio in the barrier layer was ~0.03.

The hydrocarbon solvent permeability of two of these fuel tanks was determined following a procedure similar to the one described in Control Example 1. The tanks showed a hydrocarbon solvent permeability above 0.5 g/day, which was considerably higher than specified by CARB.

The poor solvent permeation resistance value was related to under fluorination of the polymer surface. This under fluorination was evidenced by a fluorine content in the barrier layer of approximately 8 μg/cm$^2$ as determined by a combination of x-ray fluorescence (XRF) and Rutherford back scattering (RBS) techniques. This example also shows that it is not possible to produce containers with enhanced solvent permeation resistance by simply using a one-step process. It also shows that a fluorine content in the barrier layer substantially greater than 8 μg/cm$^2$ is required to produce fuel tanks with good solvent permeation resistance.

EXAMPLE 7

Low-Low Fluorine Levels

Automobile fuel tanks with a nominal wall thickness of 4.0 mm were prepared from a high density polyethylene (HDPE) by the extrusion blow molding process. During the inflation process the fuel tanks were pressurized to approximately 100 psig with an inert nitrogen gas for a period of 5 seconds (Step 1 or Gas 1), after which the pressure was released from the fuel tanks to allow the nitrogen gas to escape. Because of relatively thick walls of the fuel tanks, the temperature of the polymer remained above the self-supporting temperature of HDPE. The fuel tanks then were repressurized a second time to approximately 100 psig with a reactive treatment gas containing 0.25% fluorine in inert nitrogen for a period of 15 seconds (Step 2 or Gas 2). After this the pressure was released from the fuel tanks to allow reactive gas to escape. The fuel tanks were pressurized a third time to approximately 100 psig with a reactive treatment gas containing 0.7% fluorine in inert nitrogen for a period of 10 seconds (Step 3 or Gas 3). After this the pressure was released from the fuel tanks to allow reactive gas to escape. The fuel tanks were pressurized a fourth time to approximately 100 psig with a reactive treatment gas containing 1.25% fluorine in inert nitrogen for a period of 10 seconds (Step 4 or Gas 4). Finally, the fuel tanks were vented to atmospheric pressure, purged with an ambient pressure air stream or an inert gas to remove any traces of reactive treatment gas and removed from the mold. Precautions were taken including purging the parison and gas feed lines with inert nitrogen gas to minimize and/or eliminate oxygen contaminant prior to and during fluorination of fuel tanks. The level of oxygen contaminant in the feed and exhaust lines to the polymer container was measured to be less than 50 ppm. Furthermore, the concentration of fluorine for the first and subsequent fluorination steps was selected carefully to eliminate both under and over fluorination of the fuel tanks. The tanks were, therefore, treated first with a fluorine containing gas at above the self-supporting temperature of HDPE. They were treated further with a fluorine containing gas at a temperature above or below the self-supporting temperature of HDPE or both above and below. The thickness of barrier layer was ~0.3 μm. The O/C ratio in the barrier layer was ~0.01.

Figure 3:
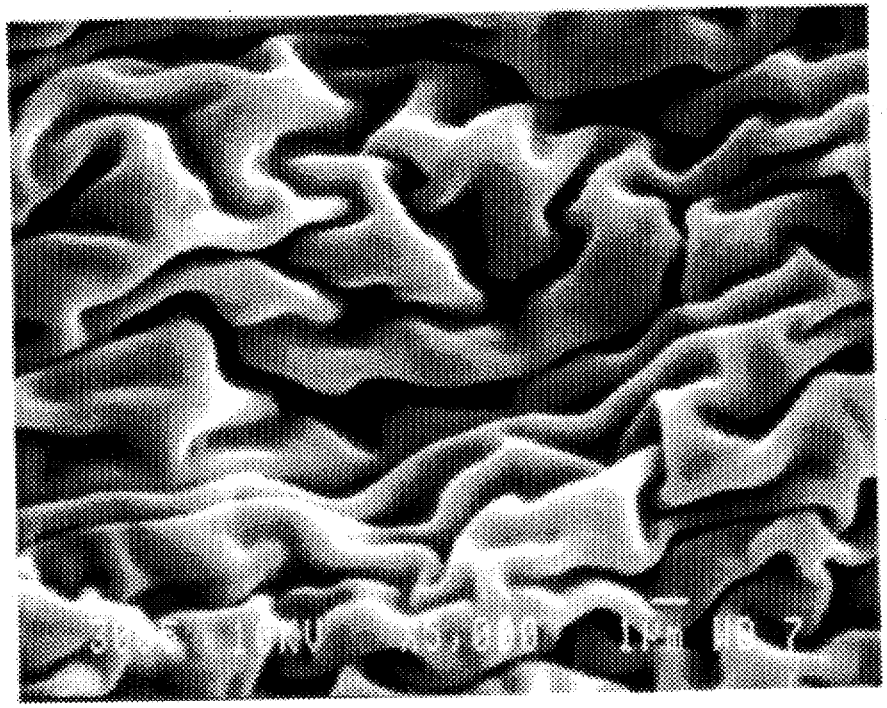
FIG. 3 is a Scanning Electron Micrograph of a fluorinated fuel tank surface at 5,000× magnification showing the appearance of a properly fluorinated surface of the fuel tank.

The hydrocarbon solvent permeability of two of these fuel tanks was determined following the procedure similar to the one described in Control Example 1. These tanks showed a hydrocarbon solvent permeability value close to 0.03 grams per day which was considerably lower than noted in Control Example 1 and specified by CARB. The ratio of the actual surface area of the fluorinated layer to the geometric surface area was approximately 1.5, indicating that the interior surface of the fuel tanks was not over fluorinated. Additionally, the fluorinated layer produced in this example had a considerably lower surface roughness than Control Examples 4 and 5, as shown by a scanning electron micrograph in FIG. 3. The concentration of fluorine in the fluorinated layer was approximately 60 μg/cm$^2$, indicating that the interior surface of the fuel tanks was not under fluorinated. From these data, surface fluorination can range from about 15 to 80 μg/cm$^2$. However, it is believed that fluorination can be as high as possible, e.g., $\geq$100 μg so long as the ratio of actual surface area to geometric surface area is maintained.

EXAMPLE 8

Low-Low Fluorine Levels

The procedure for fluorinating high density polyethylene (HDPE) fuel tanks described in Example 7 was repeated using the identical conditions. The hydrocarbon solvent permeability of three of these fuel tanks was determined following the procedure similar to the one described in Control Example 1. These tanks showed a hydrocarbon solvent permeability value close to 0.05 grams per day which was, once again, considerably lower than noted in Control Example 1 and specified by CARB, but consistent with Example 7. The ratio of the actual surface area of the fluorinated layer to the geometric surface area was approximately 1.4, indicating that the interior surface of the fuel tanks was not over fluorinated. The concentration of fluorine in the fluorinated layer was approximately 50 μg/cm$^2$, indicating that the interior surface of the fuel tanks was not under fluorinated. The O/C ratio in the barrier layer was ~0.02.

EXAMPLE 9

Low-Low Fluorine Levels

Figure 4:
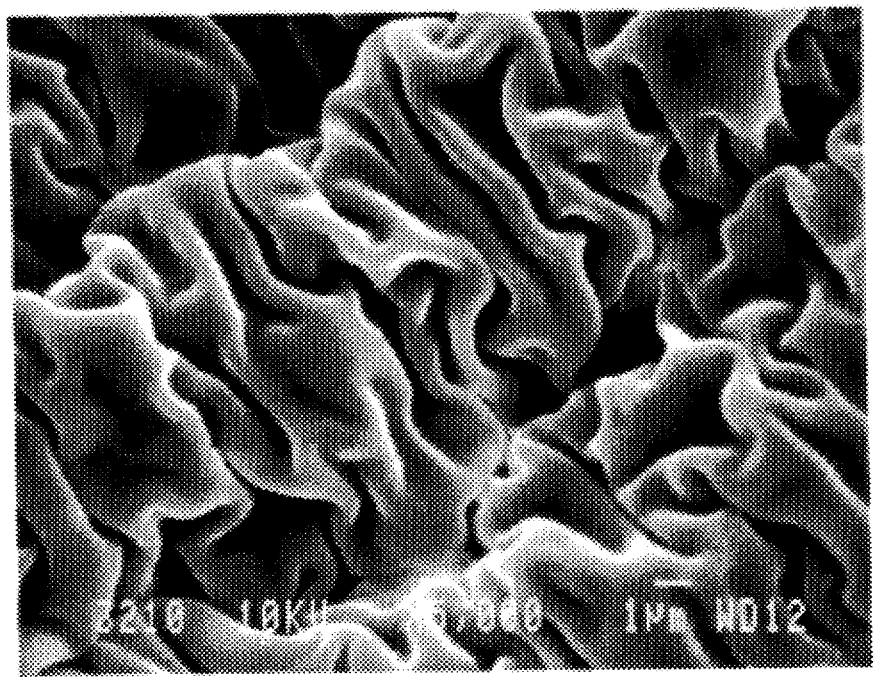
FIG. 4 is a Scanning Electron Micrograph of a fluorinated fuel tank surface at 5,000× magnification showing the appearance of a properly fluorinated surface of the fuel tank.
Figure 5:
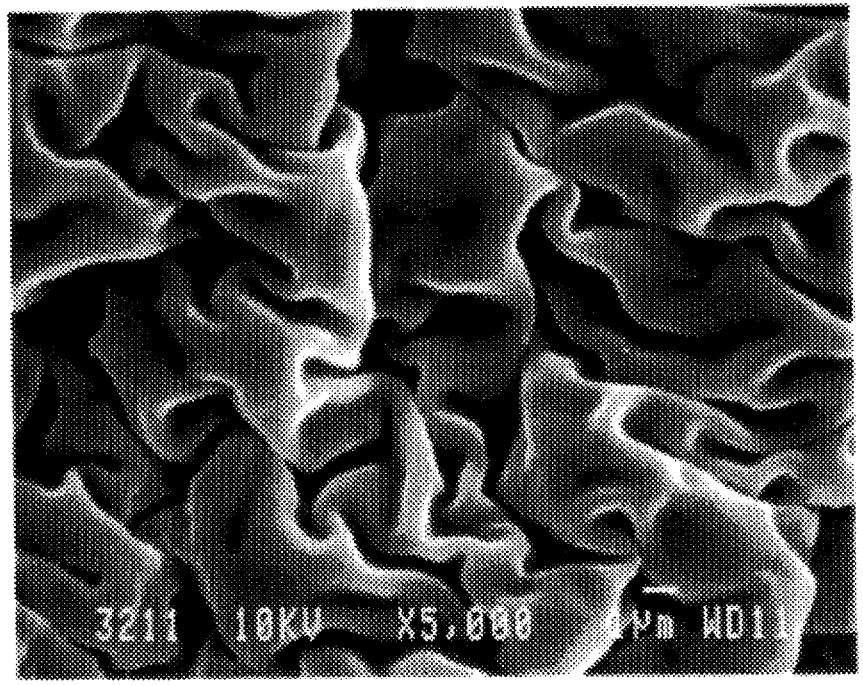
FIG. 5 is a Scanning Electron Micrograph of a fluorinated fuel tank surface at 5,000× magnification showing the appearance of a properly fluorinated surface of the fuel tank.

The procedure for fluorinating high density polyethylene (HDPE) fuel tanks described in Example 7 was repeated using the identical conditions. The hydrocarbon solvent permeability of six of these fuel tanks was determined following the procedure similar to the one described in Control Example 1. These tanks showed a hydrocarbon solvent permeability values ranging from 0.06 to 0.09 grams per day which were, once again, lower than noted in Control Example 1 and specified by CARB and consistent with Examples 7 and 8. The ratio of the actual surface area of the fluorinated layer to the geometric surface area was approximately 1.4, indicating that the interior surface of the fuel tanks was not over fluorinated. Additionally, the fluorinated layers produced in this example revealed considerably lower surface roughness than Control Examples 4 and 5, as shown by scanning electron micrographs in FIGS. 4 and 5. The concentration of fluorine in the fluorinated layer was approximately 50 µg/cm$^2$, indicating that the interior surface of the fuel tanks was not under fluorinated. The O/C ratio in the barrier layer was ~0.02.

EXAMPLE 10

Low-Low Fluorine Levels

Figure 6:
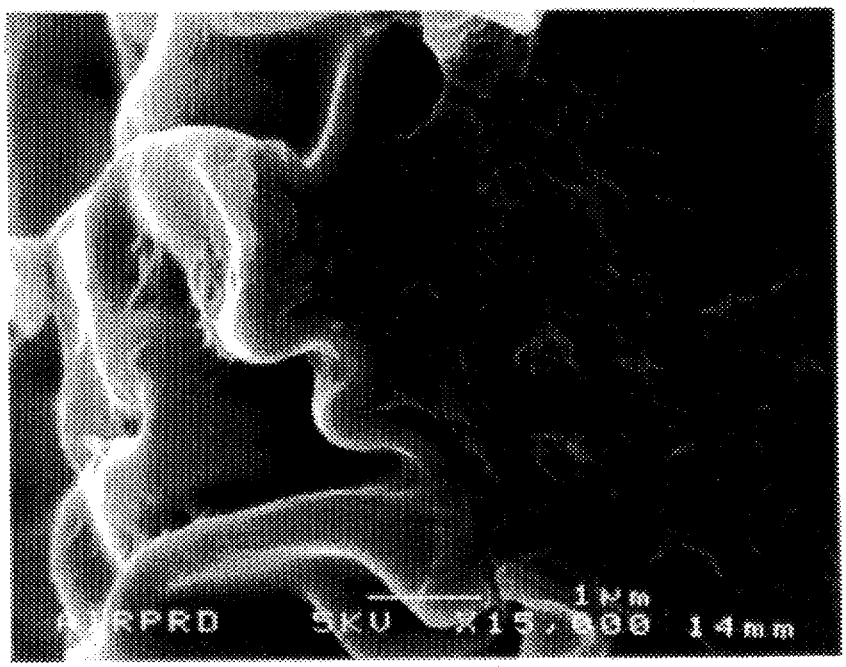
FIG. 6 is a Cross-sectional Scanning Electron Micrograph of a fluorinated fuel tank at 15,000× magnification showing thickness of the barrier layer in a properly fluorinated fuel tank.

The procedure for fluorinating high density polyethylene (HDPE) fuel tanks described in Example 7 was repeated using the identical conditions. The hydrocarbon solvent permeability of seven of these fuel tanks was determined following the procedure similar to the one described in Control Example 1 with the exception of using pure indolene solvent. These tanks showed a hydrocarbon solvent permeability value ranging from 0.01 to 0.03 grams per day, indicating an excellent permeation barrier to nonpolar hydrocarbon solvents. The thickness of barrier layer was ~0.3 µm, as can be seen in FIG. 6. The O/C ratio in the barrier layer was ~0.01.

SUMMARY

The above Control Examples clearly show that it is difficult to produce fuel tanks with enhanced solvent permeation resistance consistently and reproducibly with unmonitored and uncontrolled oxygen contamination in the parison during the fluorination process. Also, the above Examples 4 and 5 revealed that the consistency and reliability problems can not be resolved simply by minimizing and/or eliminating oxygen contaminant from the parison, They also showed that these problems can not be resolved by manipulating the concentration of fluorine in the first step alone. The consistency and reliability problems are solved by controlling the rate of fluorination in the first step and in all subsequent steps, while carefully minimizing and/or eliminating oxygen contamination.

What is claimed is:

1. A thermoplastic polymeric container having an interior surface fluorinated layer in which the fluorine concentration is greater than 15 µg fluorine per cm$^2$, an oxygen-to-carbon ratio in the fluorinated layer of less than about 0.08, and a ratio of actual surface area to geometric surface area of less than 1.8.

2. The polymeric container of claim 1 wherein the polymeric container is comprised of high density polyethylene.

3. The polymeric container of claim 1 having an oxygen-to-carbon ratio in the fluorinated layer of less than about 0.03.

* * * * *